United States Patent [19]

Forsberg

[11] Patent Number: 5,098,645
[45] Date of Patent: Mar. 24, 1992

[54] CONTAINER FOR REPROCESSING AND PERMANENT STORAGE OF SPENT NUCLEAR FUEL ASSEMBLIES

[75] Inventor: Charles W. Forsberg, Oak Ridge, Tenn.

[73] Assignee: The United States of America as represented by the United States Department of Energy, Washington, D.C.

[21] Appl. No.: 665,209

[22] Filed: Mar. 6, 1991

[51] Int. Cl.$^5$ .................. G21C 19/00; G21F 5/00
[52] U.S. Cl. ................... 376/272; 250/506.1; 250/507.1
[58] Field of Search ............... 376/272, 311; 250/506.1, 507.1; 252/627

[56] References Cited

U.S. PATENT DOCUMENTS

| | | | |
|---|---|---|---|
| 4,209,420 | 4/1980 | Larker | 252/626 |
| 4,257,912 | 3/1981 | Fleischer et al. | 252/626 |
| 4,326,922 | 4/1982 | Ferrari et al. | 376/435 |
| 4,642,204 | 2/1987 | Burstrom et al. | 252/633 |
| 4,645,624 | 2/1987 | Ramm et al. | 252/628 |
| 4,649,018 | 3/1987 | Waltersdorf et al. | 376/272 |
| 4,666,659 | 5/1987 | Lusk et la. | 376/272 |
| 4,683,110 | 7/1987 | Baudro et al. | 376/261 |
| 4,711,758 | 12/1987 | Machado et al. | 376/272 |
| 4,808,337 | 2/1989 | Ramm et al. | 252/628 |
| 4,834,917 | 5/1989 | Ramm et al. | 252/633 |
| 4,930,650 | 6/1990 | Wells | 220/21 |

OTHER PUBLICATIONS

A. E. Ringwood, et al., "Immobilisation of high level nuclear reactor wastes in SYNROC", vol. 278, 15 Mar. 1979.
A. E. Ringwood, et al., "Immobilization of high-level waste in ceramic waste forms", Phil. Trans. R. Soc. Lond., A 319, 1986.
A. E. Ringwood, et al., "Uniaxial Hot-Pressing in Bellows Containers", Nuclear & Chemical Waste Mgmt., vol. 4, 1983.

*Primary Examiner*—Brooks H. Hunt
*Assistant Examiner*—Ngoclan T. Mai
*Attorney, Agent, or Firm*—Katherine P. Lovingood; Stephen D. Hamel; William R. Moser

[57] ABSTRACT

A single canister process container for reprocessing and permanent storage of spent nuclear fuel assemblies comprising zirconium-based cladding and fuel, which process container comprises a collapsible container, having side walls that are made of a high temperature alloy and an array of collapsible support means wherein the container is capable of withstanding temperature necessary to oxidize the zirconium-based cladding and having sufficient ductility to maintain integrity when collapsed under pressure. The support means is also capable of maintaining their integrity at temperature necessary to oxide the zirconium-based cladding. The process container also has means to introduce and remove fluids to and from the container.

5 Claims, 3 Drawing Sheets

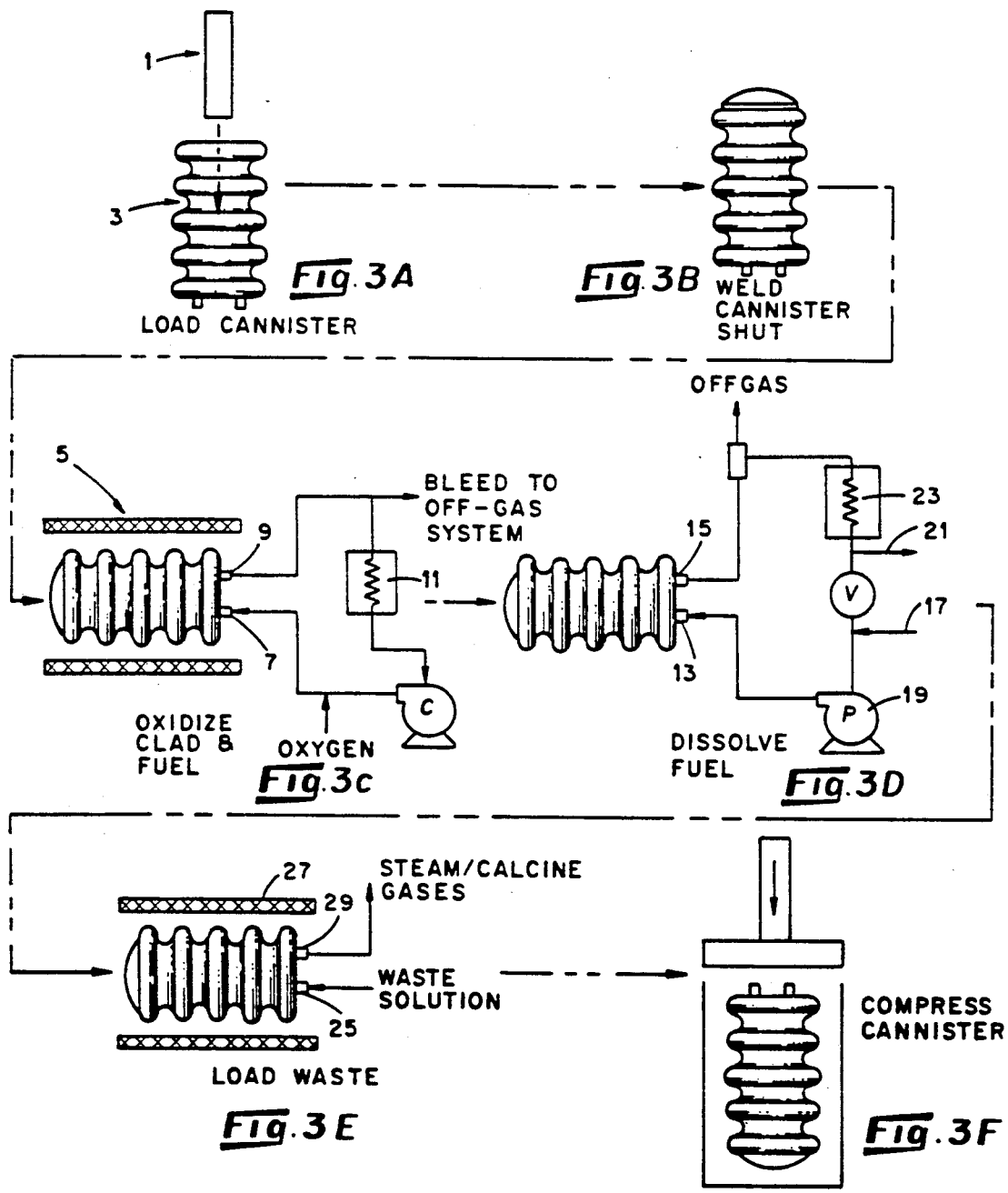

CONTAINER FOR REPROCESSING AND PERMANENT STORAGE OF SPENT NUCLEAR FUEL ASSEMBLIES

This invention relates to a process for reprocessing spent nuclear fuel and more particularly to an integrated process where nuclear fuel is reprocessed in a single containment vessel and that vessel is also used as the disposal container. The invention was developed pursuant to a contract with the United States Department of Energy, contract number DE-AC05-84OR21400.

BACKGROUND OF THE INVENTION

In a nuclear reactor, fuel rods made of fissionable material such as uranium and plutonium undergo nuclear fission that converts the fuel to other elements, the products of the fission reaction. The conversion of the fissionable material is significant because it must eventually be replaced if the reaction is to be maintained. Therefore, it is necessary to constantly remove the products of the reaction and replace them with more fissionable material. Since the fissionable material is expensive, it is feasible to reprocess the fuel rods by removing the products of the reaction. The fissionable material remaining after the contaminating products have been removed can then be returned to the reactor for further reaction.

Although it is economically feasible to recover nuclear fuel, it is still extremely expensive, about $1000 per kg. This is due to the very high radioactivity of the spent fuel that makes it dangerous to handle, and the many mechanical and chemical steps involved that must be performed without operator exposure. Each major process that requires separate processing equipment carries a very high cost because of the radiation shielding requirements and the necessity of remote handling operations.

Therefore there is a continuing need to provide a method for reprocessing nuclear fuel that minimizes the number of separate processing steps needed so that shielding and remote operation costs can be reduced.

SUMMARY OF THE INVENTION

In view of the above needs, it is an object of this invention to provide a process for recovering spent nuclear fuel that has a minimum of separate processing steps.

It is another object of this invention to provide a process for removal of fission material and disposal of radioactive products in the same container.

An additional object of this invention is to provide an article of manufacture that can be used for both the removal of nuclear fuel from contaminated rods and also the disposal of radioactive fission products.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the apparatus of this invention may comprise a cylindrical container that is sealable and collapsible, having walls that are made of a high temperature alloy capable of withstanding temperatures necessary to oxidize zirconium-based cladding. Within the container there is an array of collapsible support means for holding zirconium-based cladding fuel assemblies that will allow intimate contact of fluids with the assemblies. The support means also must maintain its integrity at temperatures necessary to oxidize zirconium. There is also a means to introduce fluids into the sealed container as well as a means to remove fluids from the container.

The invention is also a process for extracting uranium and plutonium fuel in the reprocessing of spent nuclear fuel assemblies by heating the assemblies to a temperature sufficient to oxidize the zirconium-based cladding in the presence of oxygen and a catalyst gas, the catalyst gas being capable of lowering the oxidation temperature to about 1000° C.

This invention provides an apparatus and processes that are improvements over the conventional reprocessing techniques that required a great amount of shielding and remote handling which were expensive and difficult.

BRIEF DESCRIPTION OF THE DRAWINGS

FIGS. 3A-3F show a diagram of the process operations for reprocessing spent nuclear fuel using a single canister process container.

DETAILED DESCRIPTION OF THE PREFERRED EMBODIMENT

This invention is a method to reprocess zirconium alloy clad spent fuel containing uranium and/or plutonium in the chemical form of metal, metal oxide, metal nitride or metal carbide. The reprocessing includes both the chemical removal of products from the spent fuel as well as the chemical and mechanical processing required for conversion of the waste into a form suitable for final disposal.

The novel aspects of the invention include not only an unconventional chemical reaction process but also a new apparatus, a single canister process (SCP) container where many steps are integrated and executed inside a single closed container.

The chemical reaction process of this invention involves heating to extremely high temperatures, high enough to destroy the integrity of the zirconium-based cladding resulting in a powdered zirconium oxide product and exposing the uranium and plutonium to enable easy chemical removal for reprocessing. This is made possible by the use of the SCP container that is used not only as a process container, but also as the disposal container. Using conventional equipment, this process would not be feasible due to the radioactive contamination resulting from such a high temperature process and the expense of disposing of the conventional equipment after contamination.

Figure 1A:
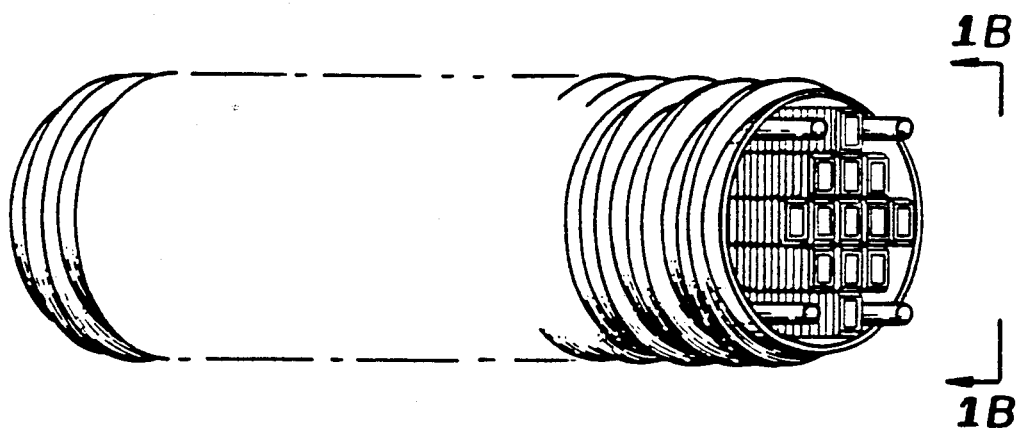
FIGS. 1A-1C show a single canister process container and its characteristics.
Figure 1B:
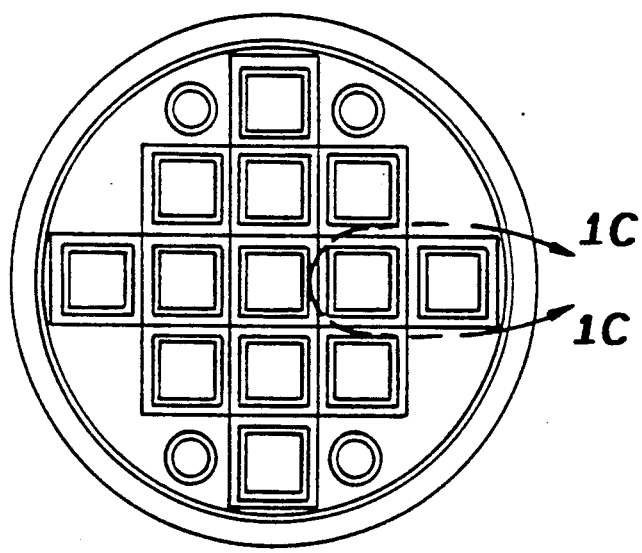
Figure 1C:
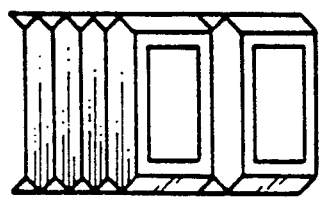

The novel SCP container, FIG. 1A, is the location for most of the chemical process steps. One or more fuel assemblies are placed in the SCP container which has multiple entry and exit tubes. It has fluted walls and is made of metals capable of withstanding high temperatures for about 100 hours. Fuel elements are placed inside the container that is then sealed. This operation can be performed in a spent fuel storage pool or a hot cell.

The container is then heated to between 800° C. and 1200° C. while oxygen mixed with nitrogen is slowly introduced into the cylinder in such a manner that it comes into intimate contact with the fuel assemblies. There is a simultaneous slow bleed of gases from the cylinder to an off gas system. These gases include the fission product gases, such as $I_2$, $H_2O$, $CO_2$, Xe and Kr, as well as excess nitrogen after the depletion of oxygen. Under these conditions the key chemical reactions are $$Zr + O_2 \rightarrow ZrO_2$$

$$UO_2 + O_2 \rightarrow UO_3 + U_3O_8$$

These reactions are meant to be illustrative and not intended to exclude other oxidation reactions that occur. Other chemical forms of uranium, as well as plutonium, present, such as nitrides and carbides, will also be converted to the oxide form. These reaction equations are not intended to be stoichiometric but rather to indicate that there is a mixture of oxides resulting from the process.

In this high temperature process there is total zirconium clad failure, converting what was before a high temperature alloy to a powder form. This allows oxygen and chemicals later in the process access to the uranium and plutonium fuel that had been previously protected by the clad. The various volatile fission products are driven off.

Figure 2:
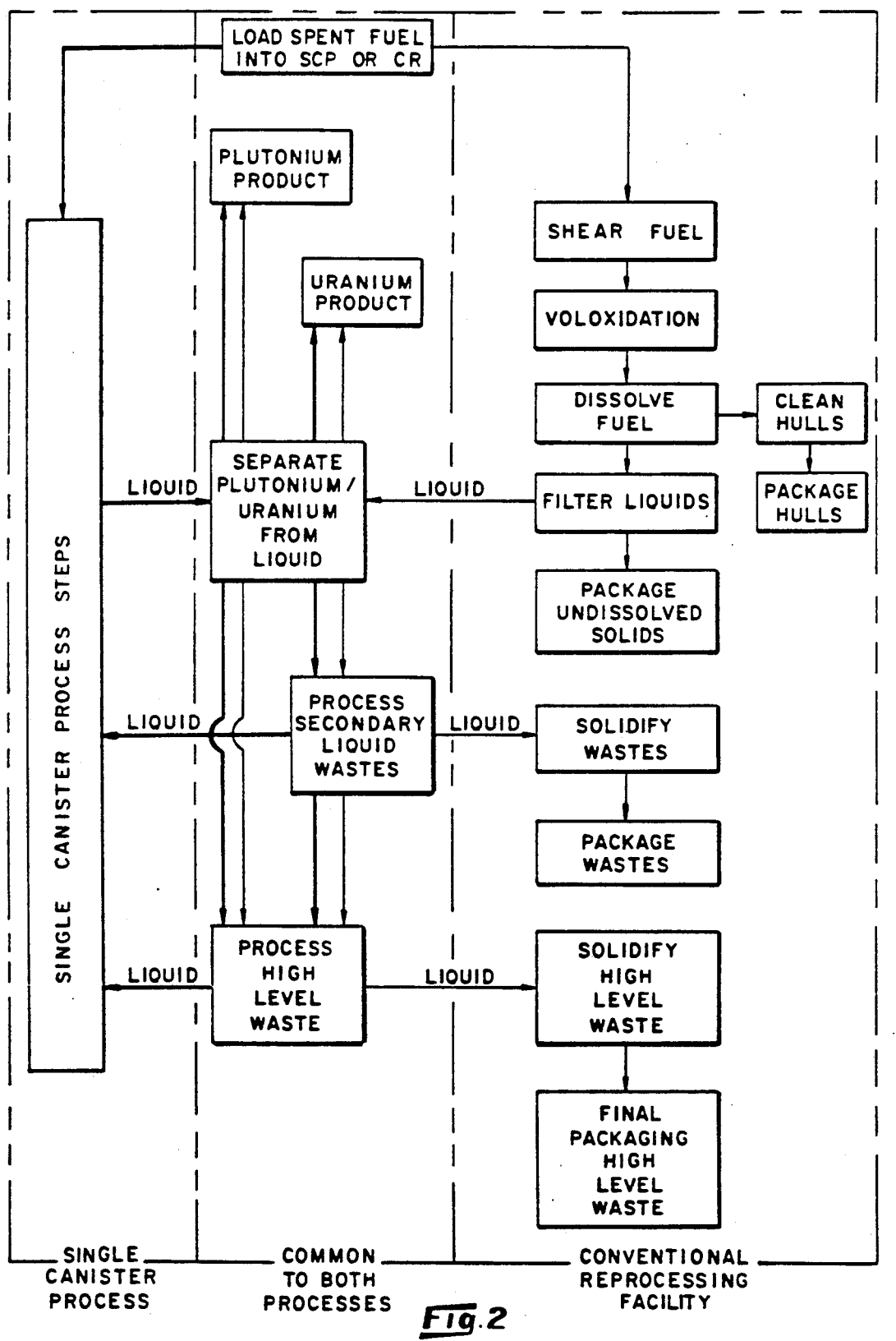
FIG. 2 is a comparison of the process equipment requirements of the claimed process and the conventional process.

FIG. 2 compares the conventional method for reprocessing nuclear fuels and the method of this invention. Each process step, indicated by a separate box, is performed in separate process equipment. It is clear that the conventional method shown on the right involves significantly more equipment than the method of this invention, shown on the left. Furthermore, it requires the mechanical transfer of highly radioactive solids, such as sheared fuel, cladding and undissolved residues, to and from separate process equipment. The steps in the center of the diagram are common to both processes.

First the excess hardware associated with spent fuel is removed. This is a standard commercial operation which can be conducted in a pool or hot cell and is common to both processes. The first process step of the invention is to load spent fuel into the SCP container and weld the container shut.

In the second step of the invention the canister is heated to about 800° C. to 1000° C. or more while admitting oxygen to oxidize the cladding and spent uranium and plutonium fuel. This process also destroys the zirconium cladding integrity and expose the zirconium and plutonium for later chemical reactions. Other catalyst gases, such as nitrogen, can also be admitted and are desirable to lower the oxidation reaction temperature of oxygen with the zirconium clad.

Compared with the process of this invention, the conventional process requires the rods to be chopped into small pieces to break the zirconium clad integrity, that the pieces be placed in a furnace and heated to oxidize the plutonium and uranium to convert them to higher oxides and drive off the volatile fission products. This process, known as voloxidation, does not oxidize significant quantities of zirconium due to the temperature limitations of the conventional process equipment. Compared to the one step oxidation of the entire rod in the canister, the conventional process is expensive, time consuming, requires significantly more equipment, and is not as efficient.

The third step is dissolution of the uranium and plutonium with a dissolution agent such as nitric acid followed by separation of plutonium, uranium and other valuable materials from the aqueous process streams. The operations of this step include spent fuel dissolution, venting of the offgases from dissolution, filtering of liquor from the dissolver and solvent extraction to recover products. To aid in dissolution the container can use techniques to assure mixing, such as ultrasonic mixers, flow mixers and physical rocking of the canister. All of the operations, except solvent extraction, can be performed within the SCP container.

In a conventional plant, solids from the shear are placed in a dissolver vessel with nitric acid for dissolution of uranium and plutonium. Liquid is filtered from the dissolver vessel after which solid cladding hulls are removed and packaged as waste. The filter residues must be removed from the filters and packed for waste disposal as well. In the process of the invention, these steps are all performed within the SCP container.

In both the conventional process and the process of the invention the aqueous solution containing the fuel to be recovered is removed from the dissolver vessel and the SCP container, respectively, and then subjected to solvent extraction to remove the uranium and plutonium fuel from the solvent, which still contains dissolved waste.

In the process of the invention this waste is returned to the SCP container for disposal. It is chemically processed with appropriate solidification agents, known to persons of ordinary skill in the art, and may be either dried and pneumatically transferred or pumped as a slurry back into the SCP container. Other secondary wastes may also be disposed of by placement within the container using similar processes.

Now the SCP container holding oxidation products of the cladding material, radioactive products of the fission reaction, wastes from the solvent extraction process and solidification agents is ready for disposal.

The SCP container is hot pressed to compact the disposal product. This process is the same as that performed in the disposal of high level waste as synrock. The compression is facilitated by the fluted shape of the SCP container.

Turning to the canister, for the purposes of the heating and oxidation step, it must be made of a material that can withstand high temperatures under extreme chemically oxidizing conditions. Examples of appropriate metals include nickel aluminides and other nickel-based alloys. These are only examples; other metals could be selected by persons of ordinary skill in the art of metallurgy. It is important to point out that the criteria for selection is broadened by the fact that the canister is subjected only to low stresses, it needs to perform less than 100 hours and significant changes in dimension, up to 10%, are acceptable. The final hot pressing step reconverts the SCP package to a standard diameter for ease of handling during disposal operations. Since the canister is used for such a short time and it is disposable, it can be used under higher temperatures and more aggressive chemical conditions than permanent equipment could be subjected to.

Canisters of different sizes can be used. FIG. 1A shows a canister for 13 pressurizes water reactor fuel assemblies. The canisters are made of corrugated materials to assure easy compression of the canister when filled with waste. Parts of the canister that are in contact with zirconium cladding material have ceramic coatings to prevent local canister melting due to exothermic oxidation reactions of spent fuel and cladding. The exit tubes to the canister have filters to assure only clean liquids and gases exit the canister. The boxes containing the fuel rods must be open to fluid flow so the chemical reactants are in intimate contact with the rods in order to effect leaching.

The composition and process described in the following example is intended to be illustrative and not in any way a limitation on the scope of the invention. Persons of ordinary skill in the art should be able to envision variations on the general principle of this invention that fall within the scope of the generic claims that follow.

EXAMPLE

The process is schematically set forth in FIG. 3A through 3F. In FIG. 3A spent assemblies or pins 1 are placed within an SCP container 3 and the container is welded shut, FIG. 3B. The SCP canister, FIG. 3C, is placed in a furnace 5 and heated to about 800° to 1000° C. At the same time, a gas stream containing oxygen is introduced through an entrance port 7 to cause oxidation of zirconium cladding as well as the spent fuel. The oxidation of the zirconium cladding exposes the uranium and plutonium fuel for later chemical dissolution, while oxidation of the fuel places it in a chemical form that is easily dissolved. Fuel oxidation also breaks up the spent fuel by expansion caused by chemical conversion of dense $UO_2$ to less dense $U_3O_8$ which aids the later dissolution steps. Off gases from this process are removed through an exit port 9. A heat exchanger 11 can be used to cool or heat the oxygen containing gas stream to better control the rate of the oxidation reaction. After oxidation, the canister is removed from the furnace and dissolution agents ar introduced into the system, FIG. 3D, at a point 17 and the moved into the SCP canister through an entrance port 13 using a circulation pump 19. The dissolution is aided by the use of the circulating pump that keeps dissolution agents moving through the SCP canister and a heat exchanger to control dissolution temperatures. This entrance port 13 can be the sam port used to introduce the gas stream. The acid dissolution agent contacts the oxidized fuel and other wastes and causes dissolution. The primary product of clad oxidation, $ZrO_2$, is insoluble and remains in the container. The aqueous stream containing the dissolved fuel is removed through an exit port 15, which can be the same exit port that carried the off-gases. The aqueous stream is removed to a separation facility 21 where uranium and plutonium are removed from the aqueous stream by solvent extraction. The volume of liquid needed to dissolve the uranium and plutonium fuel is much larger than the SCP container volume, thus, there is a continuous addition of acid solution into the loop with continuous dissolution, removal and transfer to the separation facility. A heat exchanger 23 cools or heats the dissolver solution as required. At the end of the cycle the container is drained of all liquid, at a point in the system 21, which is sent to the separation facility. The waste containing fission products that has been separated from the recovered fuel is chemically processed to the appropriate waste form with appropriate solidification agents added during processing, and is then returned to the SCP canister, FIG. 3E, through an entrance port 25. The selection of the agents can be done by any person of ordinary skill in the art. The SCP canister is again placed in a furnace 27 and heated to calcine the wastes and convert fission products to high density waste form. An alternative method is to calcine the wastes in separate process equipment and pneumatically transfer the calcine to the SCP container. During the heating step, steam and calcine gases are removed through an off-gas port 29. Finally the canister is compressed, FIG. 3F, by hot pressing to produce a high integrity waste form. For a typical synrock waste the canister would be heated to about 1050° C. then compressed at pressures up ti 20 MPa. This heat and temperature cycle is the final processing step in formation of the final waste form.

The result is a high integrity waste form comprising synrock mixed with zirconium oxide, one of the most inert, refractory materials known. The high pressure operation encapsulates the synrock in a matrix of $ZrO_2$ creating a low bulk leach rate for the waste form. This synrock-$ZrO_2$ matrix is itself within the SCP canister for further shielding. The metal not only acts as a package, but also the high thermal conductivity of the metal provides a high thermal conductivity waste form that minimizes the maximum temperatures within the waste and reduces temperatures at the centerline of the new waste package.

I claim:

1. A single canister process container for both reprocessing and permanent storage of spend nuclear fuel assemblies, said fuel assemblies comprising zirconium-based cladding and fuel, comprising:

a collapsible container, having walls that are made of a high temperature alloy capable of withstanding temperatures necessary to oxidize zirconium-based cladding and having sufficient ductility to maintain integrity when collapsed under pressure;

within said container an array of collapsible support means suitably configured to hold fuel assemblies and allow intimate contact of fluids with said assemblies, said support means capable of maintaining their integrity at temperatures necessary to oxidize said zirconium-based cladding;

a means to introduce fluids into said container;

a means to remove fluids from said container.

2. The container of claim 1 wherein said container is cylindrical.

3. The container of claim 1 wherein said high temperature alloy consists essentially of a nickel-based alloy.

4. The container of claim 3 wherein said nickel-based alloy is nickel aluminide.

5. The container of claim 1 wherein said support means consists essentially of a high temperature ceramic.

* * * * *